(12) United States Patent
Winter et al.

(10) Patent No.: US 7,245,227 B2
(45) Date of Patent: Jul. 17, 2007

(54) METHOD AND APPARATUS FOR PREPARING MEDIA

(75) Inventors: Steven J. Winter, Stanwood, WA (US); Mike Wills, Hamilton, OH (US)

(73) Assignee: Intermec IP Corp., Everett, WA (US)

( * ) Notice: Subject to any disclaimer, the term of this patent is extended or adjusted under 35 U.S.C. 154(b) by 621 days.

(21) Appl. No.: 10/606,654

(22) Filed: Jun. 25, 2003

(65) Prior Publication Data

US 2005/0021172 A1 Jan. 27, 2005

(51) Int. Cl.
*G08B 21/00* (2006.01)

(52) U.S. Cl. ............................ 340/686.2; 340/572.1; 340/686.6; 156/379.7; 156/387; 235/435

(58) Field of Classification Search ...................... None
See application file for complete search history.

(56) References Cited

U.S. PATENT DOCUMENTS

| 5,564,846 A * | 10/1996 | Katsumata .................. 400/611 |
|---|---|---|
| 5,772,834 A | 6/1998 | Chiloff et al. ............... 156/351 |
| 6,114,962 A | 9/2000 | Wiklof et al. ............ 340/572.8 |
| 6,147,604 A | 11/2000 | Wiklof et al. ............ 340/572.1 |
| 6,163,260 A | 12/2000 | Conwell et al. ......... 340/572.8 |
| 6,278,413 B1 | 8/2001 | Hugh et al. .................. 343/818 |
| 6,280,544 B1 | 8/2001 | Fox et al. ...................... 156/64 |
| 6,286,763 B1 | 9/2001 | Reynolds et al. ...... 235/472.01 |
| 6,508,399 B2 | 1/2003 | Sasaki et al. ............... 235/381 |
| 6,645,327 B2 | 11/2003 | Austin et al. .................. 156/64 |
| 2002/0062898 A1 | 5/2002 | Austin et al. .................. 156/64 |
| 2003/0063139 A1 | 4/2003 | Hohberger et al. ............ 347/2 |

* cited by examiner

*Primary Examiner*—Julie Bichngoc Lieu
(74) *Attorney, Agent, or Firm*—Seed IP Law Group PLLC

(57) ABSTRACT

Work tools such as a printhead, platen, and/or cutting head are spaced normally with respect to a media path based on a location of one or more objects carried by the media, and the position of the media with respect to the work tool. Additionally or alternatively the work tools are selectively operated based on a location of one or more objects carried by the media, and the position of the media with respect to the work tool. The approaches are suitable for the manufacture and use of RFID tags and labels.

52 Claims, 10 Drawing Sheets

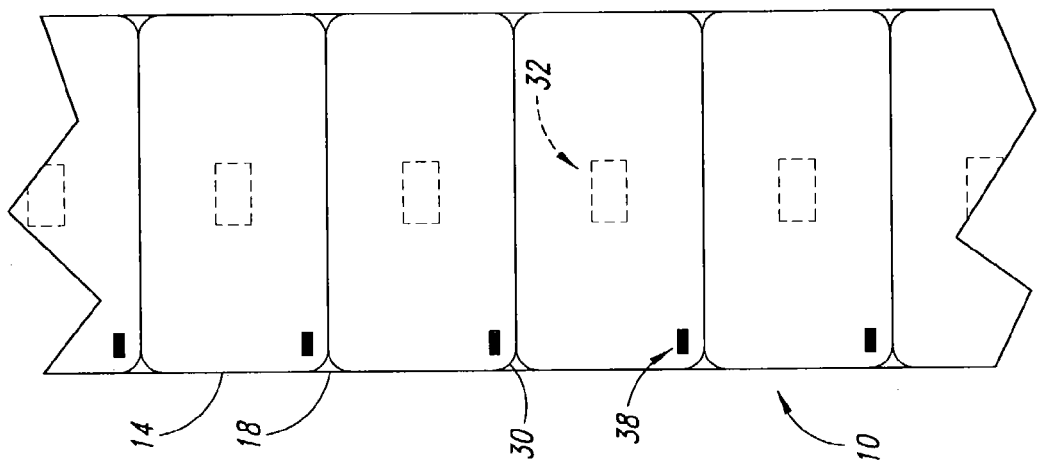
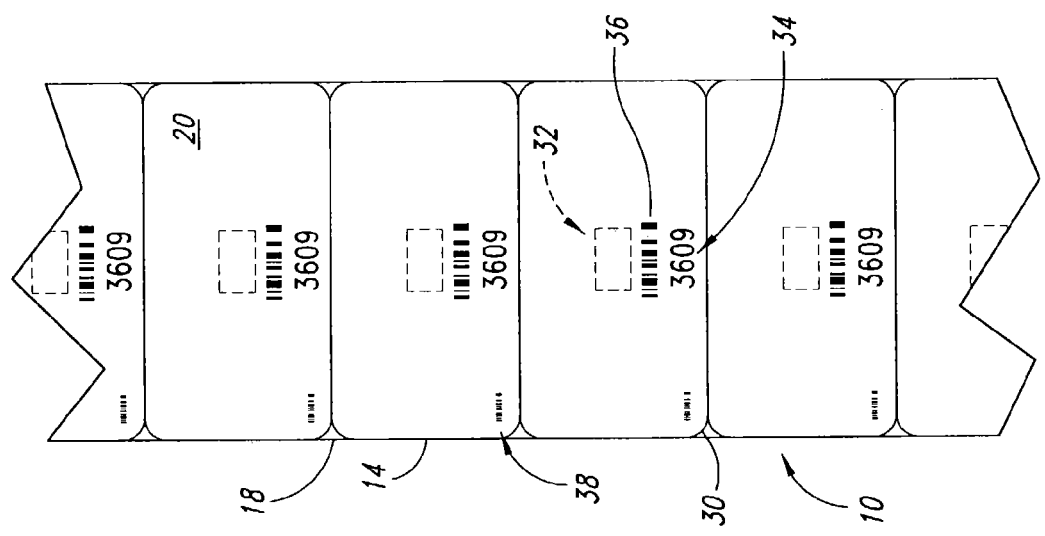
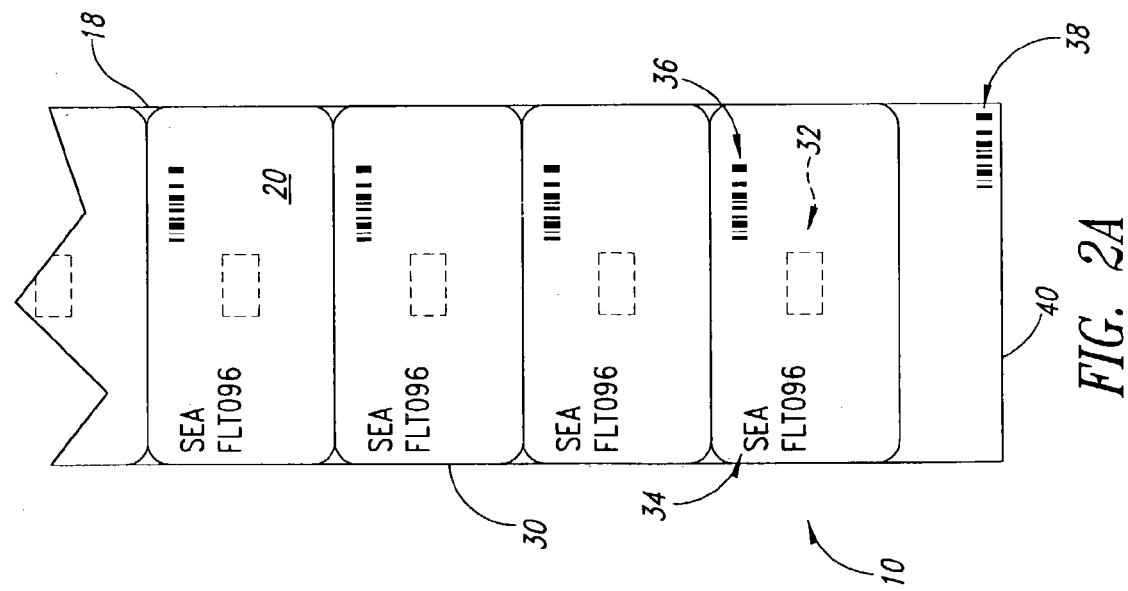

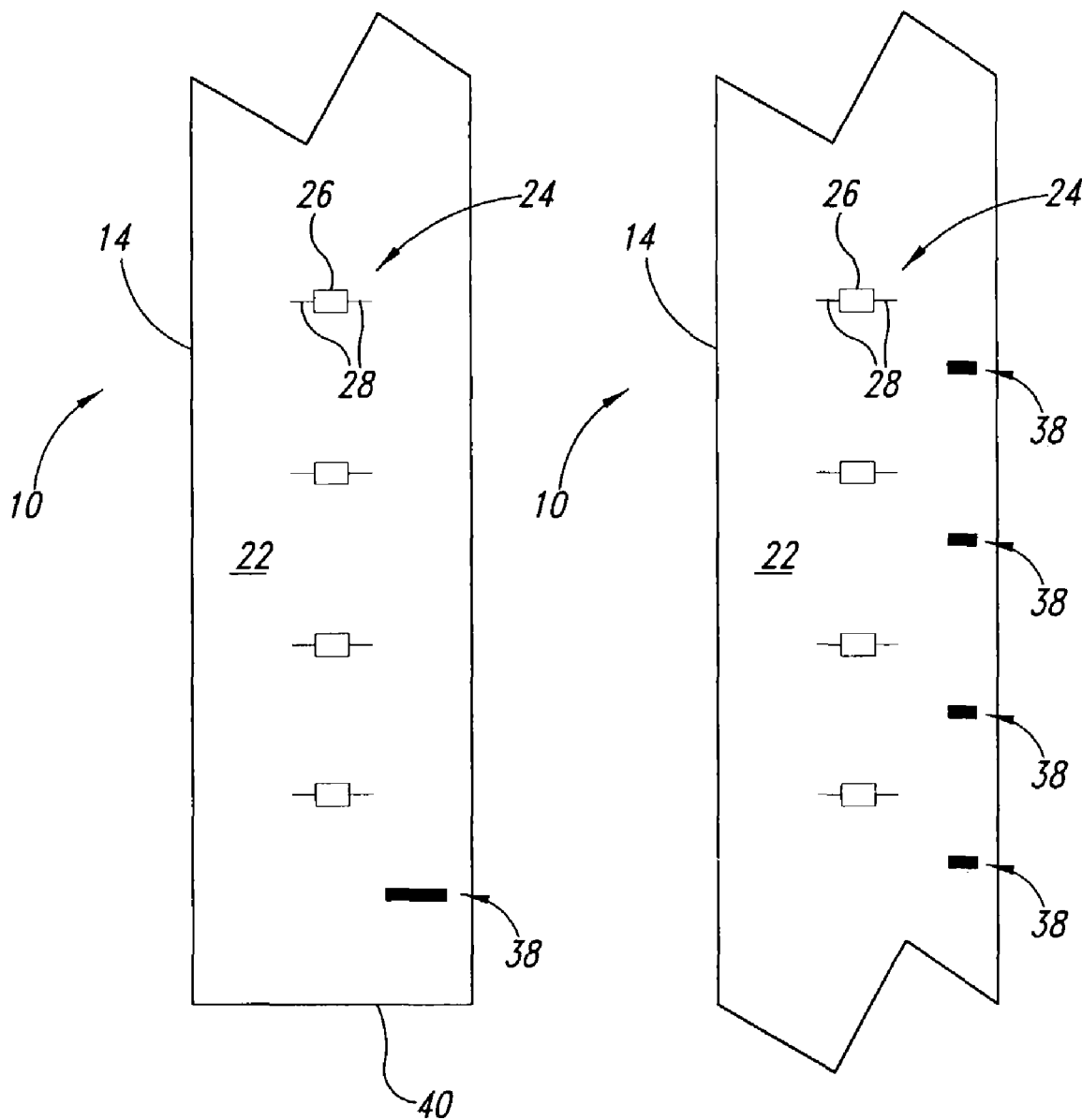
*FIG. 3A*  *FIG. 3B*

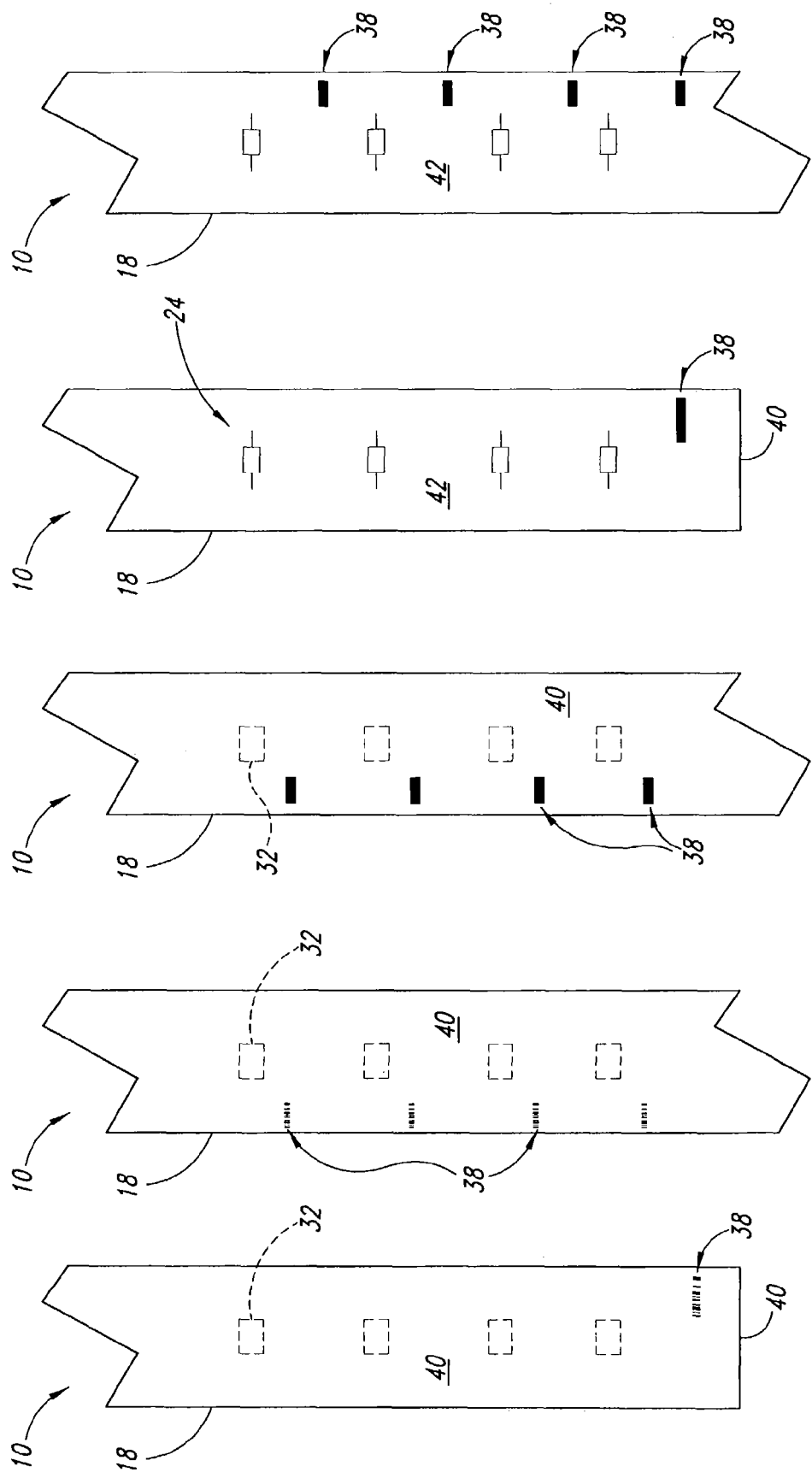

METHOD AND APPARATUS FOR PREPARING MEDIA

BACKGROUND OF THE INVENTION

1. Field of the Invention

This disclosure is generally related to the preparation of media, for example labels and tags, and more particularly to the preparation of media carrying objects, for example semiconductor chips, electrical traces and/or radio frequency identification (RFID) circuits.

2. Description of the Related Art

A large variety of applications employ media of various types for a multitude of purposes. For example, tags and labels allow the identification, tracking and/or inventorying of luggage, parcels, boxes, merchandise, files or folders, products, and/or other items. Tags and labels also allow the identification and/or tracking of people, for example patients in medical facilities or employees in a work setting. Tags and labels also allow the identification of locations, such as exhibits in a museum, shelves in a store or file room, and/or rooms in a building or office. Licenses or registration stamps permit identification, tracking and/or verification that taxes and/or other fees have been collected on associated items such as vehicles, alcohol, and/or tobacco products among other items.

While the media may take a large variety of forms, it commonly includes a face sheet or substrate which may carry optically encoded information such as printed machine-readable and/or human-readable information. The media may include an adhesive layer carried by the face sheet, allowing the media to be physically associated with an object, place or person to be identified or tracked. The adhesive layer may employ a self-adhesive formulation. In such a case, a release liner or backing overlies the adhesive layer. The release liner is selectively removable by an end user to expose the adhesive layer for fixing or attaching the media to an object, place, and/or person. Alternatively, the adhesive layer may employ a formulation that requires some type of activation, such as the application of heat and/or moisture before adhering the media to an object, place, and/or person, or that employs special adhesives, face sheet materials or face sheet coatings that eliminate the need for a release liner. Such media typically omits the release liner and is commonly referred to as linerless media.

Some media includes objects either carried on the media or embedded within the media. For example, a class of media commonly referred to as radio frequency identification (RFID) tags includes electrical circuits in the form of radio frequency (RF) transponders. These RFID circuits typically employ an electrical trace forming an antenna on a substrate, and a semiconductor chip carried by the substrate and electrically coupled to the antenna. The RFID tag may include a discrete power source (i.e., active RFID tag), or may employ power derived from an interrogation signal (i.e., passive RFID tag) produced by an RFID reader. The RFID circuit emits an RF signal in response to an RF interrogation signal, the emitted RF signal typically encoding information stored in the RFID tag. The RFID tag may employ encoding, compression, encryption, and/or other forms of data management and data security.

Manufacturing of RFID tags typically starts with a continuous sheet or roll of media, comprising a face sheet, an adhesive layer and a release liner. The release liner is temporarily separated from the face sheet and adhesive layer, RFID circuits are inserted or formed automatically therebetween, and the release liner is reattached to the adhesive layer. The RFID circuits are often spaced along a length of the continuous sheet of media at predefined increments. RFID circuits may also be spaced laterally across the continuous sheet.

After placement or formation of the RFID circuits, the media is converted to an appropriate size for distribution to end users. Conversion commonly employs cutting, perforating, and/or scoring the media or specific layers of the media to form individual tags and labels. For example, the face sheet may be cut, perforated and/or scored to form individual labels of a desired shape and size. The adhesive layer and/or release liner may likewise be cut, perforated and/or scored. For example, the release liner may be perforated or scored to allow an end user to easily tear individual tags or labels from a roll. Conversion may also employ cutting the continuous sheet or rolls longitudinally, to create multiple sheets or rolls of an appropriate width. Conversion may also employ cutting the continuous sheet or rolls laterally to create sheets or rolls of appropriate length or diameter, respectively. The converted sheets or rolls are distributed to end users, who typically print identifying information on individual labels.

The converting process applies substantial pressures and forces to the media, which increases the probability of damage to objects carried by the media such as semiconductor chips and/or antennas and thus decreasing manufacturing yields. While semiconductor chips and antennas are thin in absolute terms, the semiconductor chips and/or antenna create an inconsistency in the thickness of the tag or label, which may be large in relative terms with respect to the nominal thickness of the tag or label. This inconsistency in thickness may have an adverse affect on the converting tools, increasing wear and shortening the useful life of the converting tools. This inconsistency in thickness may additionally, or alternatively, have an adverse affect on printing tools, for example thermal printheads and/or platens, increasing wear and shortening the life of printing tools used to print on the media. Further, the printing tools apply substantial pressures and forces to the media, increasing the probability of damage to the RFID circuits, and thus decreasing manufacturing yields. A method and apparatus to form media carrying objects, for example RFID circuits, but which avoids the foregoing drawbacks is thus desirable.

BRIEF SUMMARY OF THE INVENTION

In one aspect, an apparatus to prepare media comprises: a media path; a reader to read location information from a location indicator, the location information indicating a location along the media of a circuit carried by the media; a first media tool positioned along the media path and selectively actuatable to perform an action on at least a portion of the media moving along the media path; a media position detector positioned to detect a position of the media with respect to the first media tool as the media moves along the media path; at least a first actuator mechanically coupled to selectively retract the first media tool with respect to the media path; and a controller coupled to receive position information from the media position detector and location information from the reader, the controller configured to compare the position information and the location information and to provide signals to the first actuator to increase a distance between the first media tool and the media path when the location of the circuit carried by the media is proximate the first media tool, and to decrease the distance between the first media tool and the media path when the location of circuit carried by the media is distal the first media tool.

In another aspect, a media preparation apparatus comprises: a media path; a reader to read location information identifying at least one location of an object carried by a media; a media position detector positioned along the media path to detect a position of the media as the media moves along the media path; a first media tool positioned along the media path and selectively actuatable to perform an action on at least a portion of the media moving along the media path, a distance between the first media tool and the media path being selectively adjustable between at least a first distance where the first media tool is proximate the media path and a second distance where the first media tool is distal from the media path with respect to the first distance; and a controller coupled to receive position information from the media position detector and location information from the reader, the controller configured to control the distance of the first media tool with respect to the media path based at least in part on the position information and the location information.

In a further aspect, a media comprises: a substrate; a number of radio frequency identification circuits carried by the substrate; and at least one location indicator indicating a position of at least one of the radio frequency identification circuits on to the media.

In even a further aspect, a method of preparing a media comprises: reading location information from a location indicator carried by the media, the location indicator identifying at least one location of a circuit along the media; determining a position of the media along a media path with respect to at least a first media tool as the media moves along the media path; comparing the position of the media along the media path and the location information; increasing a distance between the first media tool and the media path when the location of the circuit carried by the media is proximate the first media tool; and decreasing the distance between the first media tool and the media path when the location of circuit carried by the media is distal the first media tool.

In yet a further aspect, a method of preparing a media comprises: reading location information identifying at least one location of an object carried by the media; determining a position of the media along a media path; determining when to adjust a distance between a first media tool and the media path based at least in part of the location information and the position of the media along the media path; and adjusting the distance between the first media tool and the media path based on the determination.

In still a further aspect, an apparatus to prepare a media comprises: means for reading location information from a location indicator, the location indicator identifying at least one location along the media of a circuit carried by the media; means for determining a position of the media along a media path with respect to at least a first media tool as the media moves along the media path; means for comparing the position of the media along the media path and the location information; and positioning means for increasing a distance between the first media tool and the media path when the location of the circuit carried by the media is proximate the first media tool and for decreasing the distance between the first media tool and the media path when the location of circuit carried by the media is distal the first media tool.

In yet still a further aspect, a media preparation apparatus comprises a media path; a reader to read location information identifying at least one location of an object carried by a media; a media position detector positioned along the media path to detect a position of the media as the media moves along the media path; a media position detector positioned along the media path to detect a position of the media as the media moves along the media path; a controller coupled to receive position information from the media position detector and location information from the reader, the controller configured to selectively actuate the first media tool to perform the action on the portion of the media based at least in part on the position information and the location information.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 2A is a top plan view of a portion of the media including a number of tags or labels formed from a face sheet of the media, the media carrying objects such as RFID circuits, face sheet of the media carrying a single machine-readable printed location indicator according to one embodiment.

FIG. 2B is a top plan view of a portion of the media including a number of tags or labels formed from a face sheet of the media, the media carrying objects such as RFID circuits, the face sheet of the media carrying a plurality of machine-readable printed location indicators.

FIG. 2C is a top plan view of a portion of the media including a number of tags or labels formed from a face sheet of the media, the media carrying objects such as RFID circuits, the face sheet of the media carrying a number of machine-readable single mark location indicators.

FIG. 3A is a bottom plan view of a portion of the face sheet of media, illustrating the placement of a number of RFID circuits, the face sheet carrying a single machine-readable magnetic location indicator strip.

FIG. 3B is a bottom plan view of a portion of the face sheet of media, illustrating the placement of a number of RFID circuits, the face sheet carrying a plurality of machine-readable magnetic location indicator strips.

FIG. 4A is a bottom plan view of a portion of a release liner of media carrying a single machine-readable printed location indicator.

FIG. 4B is a bottom plan view of a portion of a release liner of media carrying a plurality of machine-readable printed location indicators.

FIG. 4C is a bottom plan view of a portion of a release liner of media carrying a plurality of machine-readable single mark printed location indicators.

FIG. 5A is a top plan view of a portion of a release liner of media, illustrating the placement of objects such as RFID circuits and carrying a single machine-readable magnetic location indicator strip.

FIG. 5B is a top plan view of a portion of a release liner of media, illustrating the placement of objects such as RFID circuits and carrying a plurality of machine-readable magnetic location indicator strips.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with printers, cutting, perforating and/or scoring apparatus, RFID circuitry, RFID interrogators, high speed insertion apparatus, processors, memory, and computing systems have not been shown or described in detail to avoid unnecessarily obscuring descriptions of the various embodiments.

Unless the context requires otherwise, throughout the specification and claims which follow, the word "comprise" and variations thereof, such as "comprises" and "comprising," are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Figure 1:
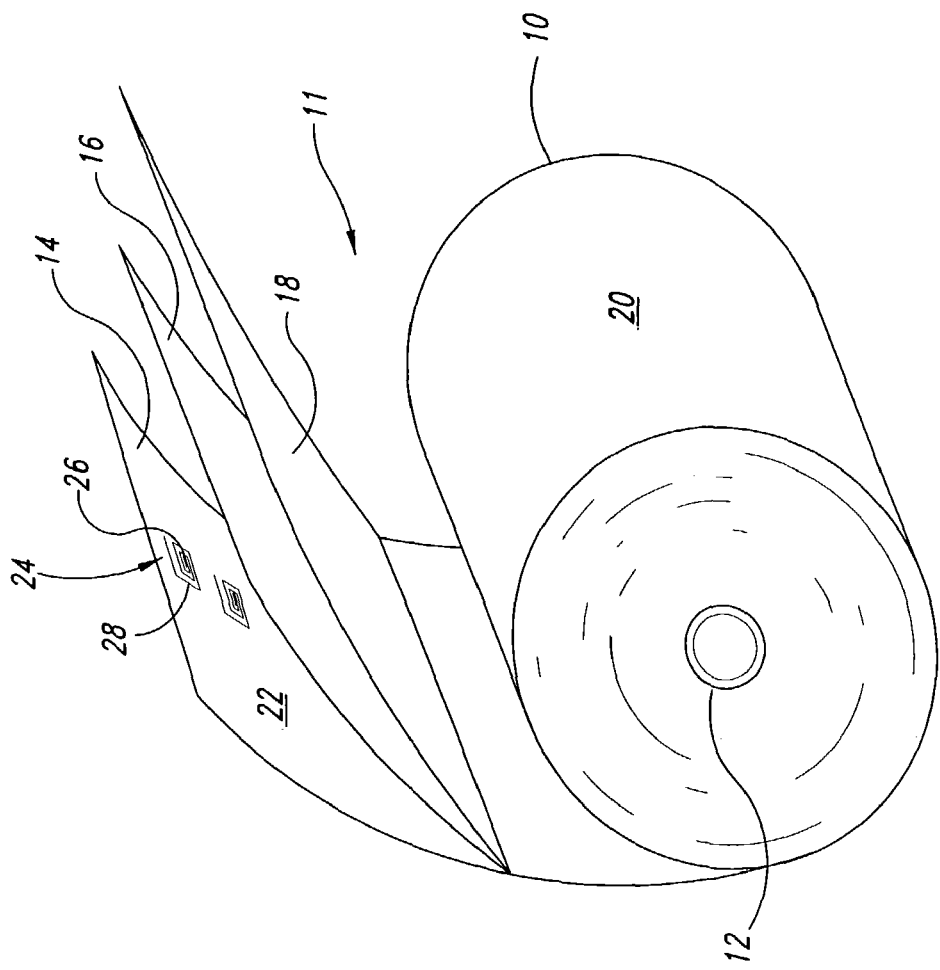
FIG. 1 is an isometric view of an exemplary continuous sheet or roll of media, with the various layers of the media separated at one end to better illustrate the structure of the media.

FIG. 1 shows media 10 formed as a roll 11 on a media carrier such as a core 12. The media 10 may take a variety of forms, and may include one or more layers. For example, the media 10 may include a face sheet 14, adhesive layer 16 and release liner 18 as illustrated in FIG. 1 in which the layers have been separated to better illustrate the structure of the media 10.

The face sheet 14 typically employs one or more components or layers, such as paper, polyester, MYLAR®, TYVEK®, plastic, polyamide, poly-ether-ether-ketone, FR4, and/or other material. The face sheet 14 includes an outer surface 20, and an inner surface 22 opposed to the outer surface 20. The adhesive layer 16 typically takes the form of a pressure sensitive or self-adhesive. The release liner 18 typically takes the form of a waxed or treated material which is selectively releasable from the adhesive layer 16. Thus, in common use, a user may expose the adhesive layer 16 by removing the release liner 18, allowing the user to adhere the tag or label to any desired surface. In some instances, linerless media may be employed. Linerless media typically requires some action to activate the adhesive 16, for example the addition of heat and/or moisture. Linerless media typically omits the release liner 18.

The media 10 may carry a variety of objects, for example RFID circuits 24. The RFID circuits 24 typically employ one or more semiconductor wafers or chips 26 and one or more electrical traces to form an antenna 28 electrically coupled to the semiconductor chip 26. While FIG. 1 illustrates a coil antenna 28, RFID circuits 24 may employ other antenna configurations, for example dipole antennas.

The RFID circuits 24 may reside on, or in, any of the layers of the media 10. In most commercial embodiments, the RFID circuits 24 will underlie the face sheet 14, thereby providing some environmental protection to the RFID circuits 24. For example, the RFID circuits 24 may be carried between the face sheet 14 and adhesive 16, or between the adhesive 16 and the release liner 18. Additionally, or alternatively, the RFID circuits 24 may be carried on an additional independent layer (not shown). For example, the RFID circuits 24 may reside on separate substrates or tags, allowing the high speed insertion of RFID circuits 24 into the media 10 to create more complicated tags or labels.

Figure 8:
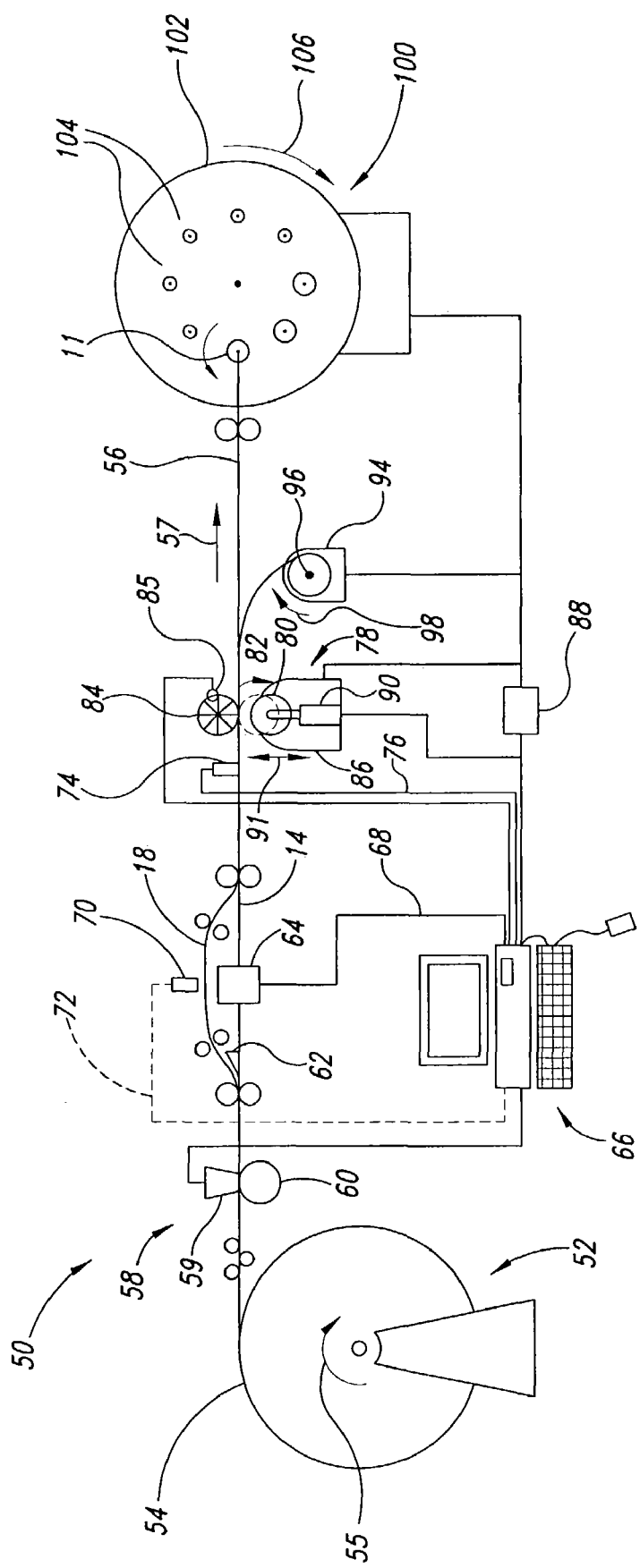
FIG. 8 is a schematic view of a media preparation apparatus to apply location indicators on the media, insert objects such as RFID circuits on the media, and/or convert the media.

The RFID circuits 24 are typically distributed along the length of the media 10, and may or may not be evenly spaced therealong. While not illustrated, the RFID circuits 24 may additionally, or alternatively, be distributed laterally across the media 10, allowing the production of multiple sheets or rolls 11 of the media 10 from a supply of media stock 54 (FIG. 8).

FIG. 2A shows a portion of the media 10 including a number of tags or labels 30 formed thereon according to one illustrated embodiment. As used herein, terms tags and labels are used interchangeably to refer to any media capable of being physically associated with a person, place or thing via any means, including but not limited to tying, hanging, adhering, attaching, stapling, riveting, and/or laminating.

The tags or labels 30 may be formed, for example, by cutting, perforating and/or scoring the face sheet 14. In some embodiments, the release liner 18 may also be perforated or scored. An area of the tag or label 30, identified by broken line box 32, illustrates the position of the object, for example RFID circuit 24, carried by the tag or label 30. This area 32 is particularly sensitive to forces and pressures, for example those which may be asserted during manufacturer preparation of the media 10 and/or end user preparation of the tag or label 30. Tags or labels 30 may include printed indicia, for example human-readable indicia 34 and/or machine-readable indicia 36. Printed machine-readable indicia 36 may, for example, take the form of symbols selected from barcodes symbologies, area code or matrix code symbologies, and/or stacked code symbologies.

In the embodiment of FIG. 2A, a single location indicator 38 identifies a location of the areas 32 (e.g., RFID circuits 24) with respect to some reference point on the media 10. The reference point may, for example, be a starting end 40 of the media 10, or may be the location of the location indicator 38 itself or some other identifiable location or mark on the media 10. The location indicator 38 may be printed on the outer surface 20 of the face sheet 14, for example as a machine-readable symbol encoding a distance or time between the reference point and the areas 32. The machine-readable symbol may be selected from symbologies such as barcodes symbologies, area code or matrix code symbologies, and/or stacked code symbologies.

As discussed in detail below, the printhead and/or platen are spaced from the media 10 when in registration with the area 32 to prevent damage to the RFID circuit 24 or other object carried by the media 10, and/or the to prevent wear or damage to the work tools (e.g., printhead and/or platen). Thus, as illustrated in FIG. 2A, the printed indicia 34, 36 does not overlap or overlie the area 32. Similarly, as will be discussed in detail below, other work tools (e.g., a cutting head and/or platen) are spaced from the media 10 when in registration with the area 32 to prevent damage to the RFID circuit 24 or other object carried by the media 10, and/or to prevent wear or damage to the work tools. Thus, as illustrated in FIG. 2A, the cuts, perforations and/or scores do not overlie or overlap the areas 32.

FIG. 2B shows another illustrated embodiment of the media 10. This alternative embodiment, and those alternative embodiments and other alternatives described herein, are substantially similar to previously described embodiments, and common acts and structures are identified by the same reference numbers. Only significant differences in operation and structure are discussed below.

In the embodiment of FIG. 2B, a number of location indicators 38 are spaced along the length of the media 10, each location indicator 38 indicating the location of a respective area 32 (e.g., RFID circuit 24) with respect to a reference point, for example a starting end of the media 10 or the location of the respective location indicator 38 itself. For example, the location indicator 38 may indicate a distance or time between the location of the location indicator 38 and the closest area 32 in a direction of travel of the media 10 along a media path in a machine such as a processor, converter and/or printer.

FIG. 2C shows yet another illustrated embodiment of the media 10. In this embodiment, the media 10 includes a number of location indicators 38 in the form of machine-readable single marks printed on the outer surface 20 of the face sheet 14 along the length of the media 10. The location indicators 38 may indicate a predetermined distance or time between the location of the location indicator 38 and the closest area 32 in a direction of travel of the media 10 along a media path in a machine such as a processor, converter and/or printer. While omitted from the illustration, the tags or labels 30 may carry human-readable indicia 34 and/or other machine-readable indicia 36, which may encode information about the particular person, place and/or thing to which the tag or label 30 will be attached.

FIG. 3A shows still another illustrated embodiment of the media 10. FIG. 3A illustrates an exemplary distribution of RFID circuits 24 along the inner surface 22 of the face sheet 14 of the media 10. In this embodiment, the face sheet 14 carries a single machine-readable location indicator 38 in the form of a magnetic strip. The magnetic strip encodes location information in the magnetic orientation of the magnetic particles forming the magnetic strip. The location information identifies the location of each of the RFID circuits 24 relative to some reference point on the media. The reference point may, for example, be a starting end 40 of the media 10, or may be the location of the location indicator 38 itself.

FIG. 3B shows a further illustrated embodiment of the media 10. FIG. 3B illustrates an exemplary distribution of RFID circuits 24 along the inner surface 22 of the face sheet 14 of the media 10. In this embodiment, the face sheet 14 carries a number of machine-readable location indicators 38, in the form of magnetic strips distributed along the length of the media 10. The magnetic strips may alternatively, or additionally, be carried on the outer surface 20 of the face sheet 14, although placement on the inner surface 22 may provide environmental protection to the magnetic strip and may enhance security by visually obscuring the magnetic strip. Each of the magnetic strips encodes location information identifying the location of a respective one of the RFID circuits 24 with respect to a reference point on the media. The reference point may, for example, be a starting end 40 of the media 10, or may be the location of the respective location indicator 38 itself.

FIG. 4A shows yet a further illustrated embodiment of the media 10. In the embodiment of FIG. 4A, the media 10 includes a single machine-readable location indicator 38 on a bottom or outer surface 40 of the release liner 18. The single machine-readable location indicator 38 may take the form of a machine-readable symbol encoding location of the areas 32 with respect to some reference point on the media 10. The reference point may, for example, be the starting end 40 of the media 10, or may be the location of the location indicator 38 itself. The machine-readable symbol may be selected from a symbology such as a barcode symbology, area or matrix code symbology or stacked code symbology.

FIG. 4B shows still a further illustrated embodiment of the media 10. In the embodiment of FIG. 4B, the media 10 includes a number of machine-readable location indicators 38 printed on the outer surface 40 along the length of the release liner 18, each location indicator 38 indicating the location of a respective area 32 (e.g., RFID circuit 24) with respect to a reference point on the media 10. The reference point may, for example, be the starting end 40 of the media 10, or may be the location of the location indicator 38 itself. The location indicators 38 may take the form of a machine-readable symbols selected from a symbology such as a barcode symbology, area or matrix code symbology or stacked code symbology.

FIG. 4C shows even a further illustrated embodiment of the media 10. In the embodiment of FIG. 4C, the media 10 includes a number of machine-readable location indicators 38 in the form of single marks printed on the bottom surface 40 of the release liner 18 along the length of the media 10. The location indicators 38 may, for example, indicate a predetermined distance or time between a reference point on the media 10 and a respective area 32 in a direction of travel of the media 10 along a media path in a machine such as a processor, converter and/or printer. The reference point may, for example, be the location of the respective location indicator 38 itself.

FIG. 5A shows another illustrated embodiment of the media 10 according to another illustrated embodiment. FIG. 5A illustrates an exemplary positioning of a number of the RFID circuits 24 on a top or inner surface 42 along the length of the release liner 18. In this embodiment, a single location indicator 38 in the form of a magnetic strip is carried on the top surface 42. The magnetic strip encodes location information identifying the location of each of the RFID circuits 24 With respect to a reference point on the media. The reference point may, for example, be a starting end 40 of the media 10 or the location of the location indicator 38 itself.

FIG. 5B shows event still another illustrated embodiment of the media 10. FIG. 5A illustrates an exemplary positioning a number of RFID circuits 24 on the inner surface 42 along the length of the release liner 18. In this embodiment, a number of location indicators 38 in the form of magnetic strips are carried on the inner surface 42, spaced along the length of the release liner 18. Each location indicator 38 encodes location information in the orientation of the particles forming the magnetic strip. The location information indicates the location of a respective area 32 (e.g., RFID circuit 24) with respect to a respective reference point on the media 10. For example, the location indicator 38 may indicate a distance or time between the location of the location indicator 38 and the closest area 32 in a direction of travel of the media 10 along a media path in a machine such as a processor, converter and/or printer.

Figure 6:
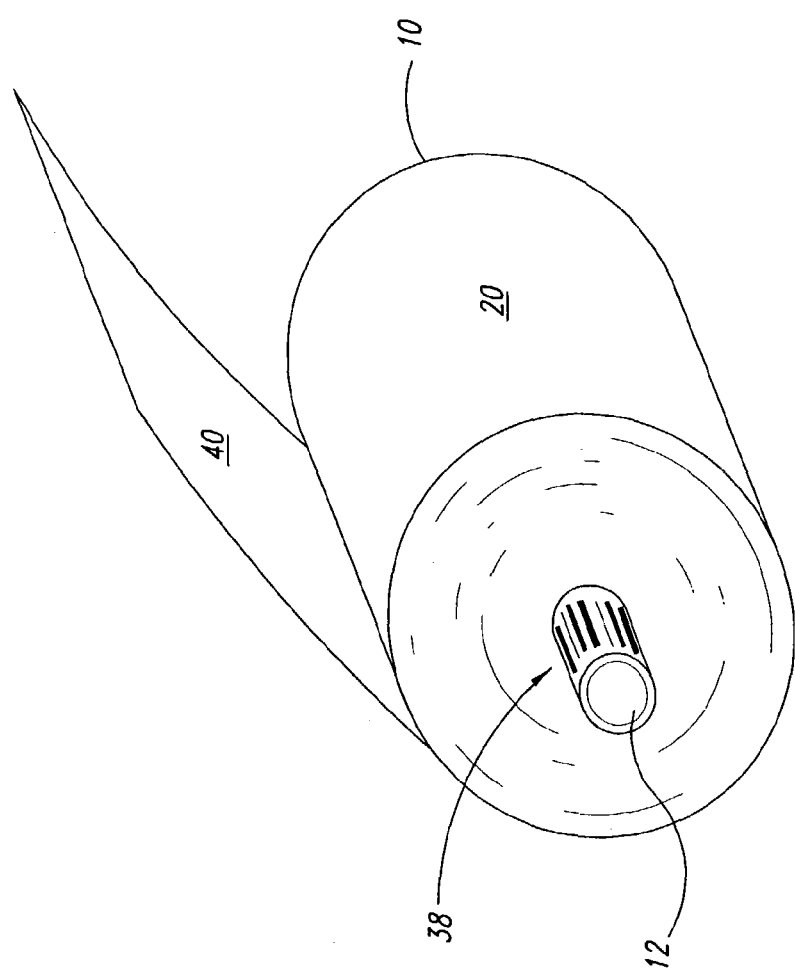
FIG. 6 is an isometric view of a roll of media carrying a single machine-readable printed location indicator on a media carrier such as a core of the roll.

FIG. 6 shows even still a further illustrated embodiment of the media 10. In this embodiment, a location indicator 38, in the form of a printed machine-readable symbol, is carried on a media carrier such as the core 12 of the roll 11 of media 10. The location indicator 38 may include location information indicating the location of one or more objects, such as RFID circuits 24, carried by the media 10 with respect to one or more reference points on the media 10. The machine-readable symbols may be selected from a symbology such as a barcode symbology, area or matrix code symbology or stacked code symbology.

Figure 7:
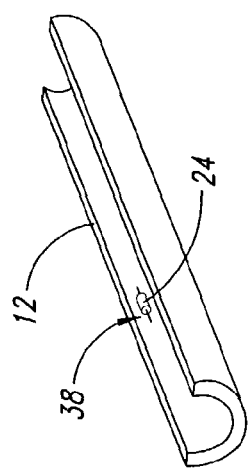
FIG. 7 is a cross-sectional isometric view of a core of the roll of media, the core carrying a machine-readable location indicator in the form of an RFID circuit storing location indicator information.

FIG. 7 shows a sectional view of a media carrier such as the roll 12, and a location indicator 38 in the form of an RFID circuit 24 carried by the roll 12. The RFID circuit encodes location information indicating the position of one or more objects, such as RFID circuits 24 carried by the media 10 with respect to one or more reference points on the media 10. The core 12 may extend beyond the edges of the media 10 as illustrated in FIG. 6, or may be flush with those edges.

FIG. 8 shows an apparatus for preparing media 10 in the form of an RFID tag or label forming apparatus 50, according to one illustrated embodiment. As discussed in detail below, the apparatus 50 applies location indicators 38 to the media 10, inserts objects such as RFID circuits 24 into the media 10, and converts the media 10 by cutting, perforating and/or scoring.

The apparatus 50 includes a media supply 52 which typically includes a quantity of stock media 54, from which smaller units of media 10 (e.g., rolls 11) may be formed. The stock media 54 typically take the form of a continuous sheet or roll. The stock media 54 may rotate about an axis as indicated by arrow 55 to supply a continuous feed of the media 10 to the apparatus 50. The media 10 follows a media path 56 through the apparatus 50 defined by rollers (unnumbered), guides (not shown), and/or other elements of the apparatus 50.

A device 58 applies one or more location indicators 38 to the media 10. In one embodiment, the device 58 takes the form of a printhead 59, for example a thermal printhead, and a platen such as platen roller 60 opposed from the printhead across the media path 56. In another embodiment, the device 58 includes an antenna (not shown) and transmitter (not shown) capable of encoding location information into a location indicator 38 in the form of an RFID circuit 24, such as that illustrated in FIG. 7.

A strip or separator bar 62 temporarily separates the release liner 18 from the face sheet 14 and adhesive 16 to allow the placement of objects, such as RFID circuits 24, on the media 10 between the face sheet 14 and release liner 18. (Note, the adhesive layer 16 is omitted from the illustration for the sake of clarity.) The separator bar 62 is typically configured to provide a sharp turn in the path of the release liner 18, to strip the release liner 18 from the face sheet 14 and exposing the adhesive 16.

An apparatus 64 inserts or applies objects, such as RFID circuits 24, on to the media 10. Insertion apparatus for inserting objects at high speed onto continuous substrates are well known in the art, so will not be discussed in detail in the interest of brevity. The RFID circuits 24 may be preformed on separate, individual substrates (not shown), with or without cover layers, to simplify the automatic insertion on the media 10. Thus, apparatus 64 may insert preformed RFID tags into the media 10 to create more complicated tags or labels 30 (FIGS. 2A-2C). For example, the apparatus 64 may adhere objects such as RFID circuits or preformed RFID tags containing RFID circuits 24 on the inner surface of the face sheet 14 via the adhesive 16.

The apparatus 64 may operate under control of a controller such as a computing system 66 via wireless or wired connection 68. The computing system 66 may automatically, or manually, allow registration of the placement of the objects on the media 10 and/or positioning of the objects with respect to the one or more reference points or location indicators 38. In ensuring proper registration, the computing system 66 may rely on an optional reader 70 coupled to the computing system 66 by wireless or wired link 72 to supply location information read from the location indicator 38 carried by the media 10. The computing system 66 may also rely on position information identifying a position of the media 10 along the media path 56 of the apparatus 50. Readers and position sensors are discussed in detail below.

A reader 74 may read the location indicator 38 and supply location information to the computing system 66 via a wireless or wired link 76. Where the location indicator 38 is an optical indicator such as a barcode symbol or single printed mark, the reader 74 takes the form of an optical reader, such as an optical scanner or imager with or without decoding circuitry and/or software. Where the location indicator 38 is a magnetic strip, the reader 74 takes the form of a magnetic strip reader with or without decoding circuitry and/or software. Where the location indicator 38 is an RFID circuit such as shown in FIG. 7, the reader 74 takes the form of an RFID interrogator, including a transmitter and receiver, or transceiver, and including at least one antenna, and may or may not include decoding circuitry and/or software.

The computing system 66 may use the location information received via the reader 74 to control a work tool such as a cutting head 78. The cutting head may include a rotary cutter 80 such as a die cutter, to cut, perforate and/or score the media 10. The rotary cutter 80 rotates about an axis in a direction indicated by arrow 82. The rotary cutter 80 operates in conjunction with a platen 84 opposed to the rotary cutter 80 across the media 10. The rotary cutter 80 may be driven by an optional motor 86, or alternatively, the motor 86 may be coupled to drive the platen 84 to move the media 10 along the media path 56. Alternatively, neither the rotary cutter 80, nor the platen 84, may be driven, the apparatus 50 relying on some other drive mechanism for advancing the media 10 along the media path 58. The computing system 66 may drive the motor 86 and/or other motors via a motor controller 88.

A position sensor 85 senses the position of the media 10 as the media 10 moves along the media path 56. The position sensor 85 may take any of a large variety of forms. For example, the position sensor 85 may take the form of an optical rotational encoder that senses the passing of optical marks carried by the rotary cutter 80 and/or platen 84, or a magnetic Reed switch, to name just a few. Also for example, the he position sensor 85 may take the form of a gap sensor that senses a gap between individual tags or labels 30 on the media 10. The position sensor 85 may include a processor (not shown) configured to determine the position of the media 10 along the media path 56. Alternatively, the position sensor 85 may simply supply position information, such as pulses, from which the computing system 66 may determine the position of the media 10.

The cutting head 78 may include an actuator 90 selectively actuatable to adjust a distance between the media 10 and at least one of the rotary cutter 80 and the platen 84, in a direction normal to the media path 56 as illustrated by double headed arrow 91. FIG. 8 shows the rotary cutter 80 (represented in broken line) in a first position proximate the media path 56, and the rotary cutter 80 (represented in solid line) in a second position spaced distally from the media path 56. The actuator 90 permits the computing system 66 to safely space either, or both, the rotary cutter 80 and the platen 84 from the media 10 as the portion of the media 10 carrying the object (e.g., RFID circuit 24) passes the cutting head 78. The actuator 90 can take any of a variety of forms including a solenoid, hydraulic piston and cylinder, or mechanical linkage and motor, to name just a few.

Additionally, or alternatively, the computing system 66 may employ the location and position information to actively drive the cutter 80 when the portion of the media 10 carrying the object (e.g., RFID circuit 24) is not in registration with the cutting head 78, and to stop driving the cutter 80 as the portion of the media 10 carrying the object is in registration with the cutting head 78. This approach may prevent damage to the object even where the cutting head 78 does not need to be selectively spaced from the media path 56.

The apparatus 50 may optionally employ a matrix take-up device 94. The matrix take-up device 94 may include a spindle 96 that rotates in a direction indicated by arrow 98 to take up the matrix (i.e., waste material) from the cutting operation.

The apparatus 50 may additionally, or alternatively, include rotary splitter cutters (not illustrated), that are oriented longitudinally with respect to the media path 56 to cut the stock media 54 into appropriate widths. Thus, the splitter cutters may split the media 10 longitudinally into two or more continuous sheets, each sheet having a number of objects distributed therealong to form separate rolls 11 of media 10.

The apparatus 50 may optionally include a turret winder 100 or other high speed take-up apparatus. The turret winder 100 includes a rotating member 102 having a number of positions 104 for carrying cores 12. The rotating member 102 moves in a direction indicated by arrow 106, successively presenting cores 12 for taking up the media 10 during high speed operation. Where the apparatus 50 includes splitter cutters, the apparatus 50 may include a number of turret winders 100, and/or a number of rotating members 102, to take up respective continuous sheets formed by the splitter cutters. A lateral cutter (not shown) may laterally cut the media 10 into appropriate lengths to form rolls 11 suitable for the end user application.

Figure 9:
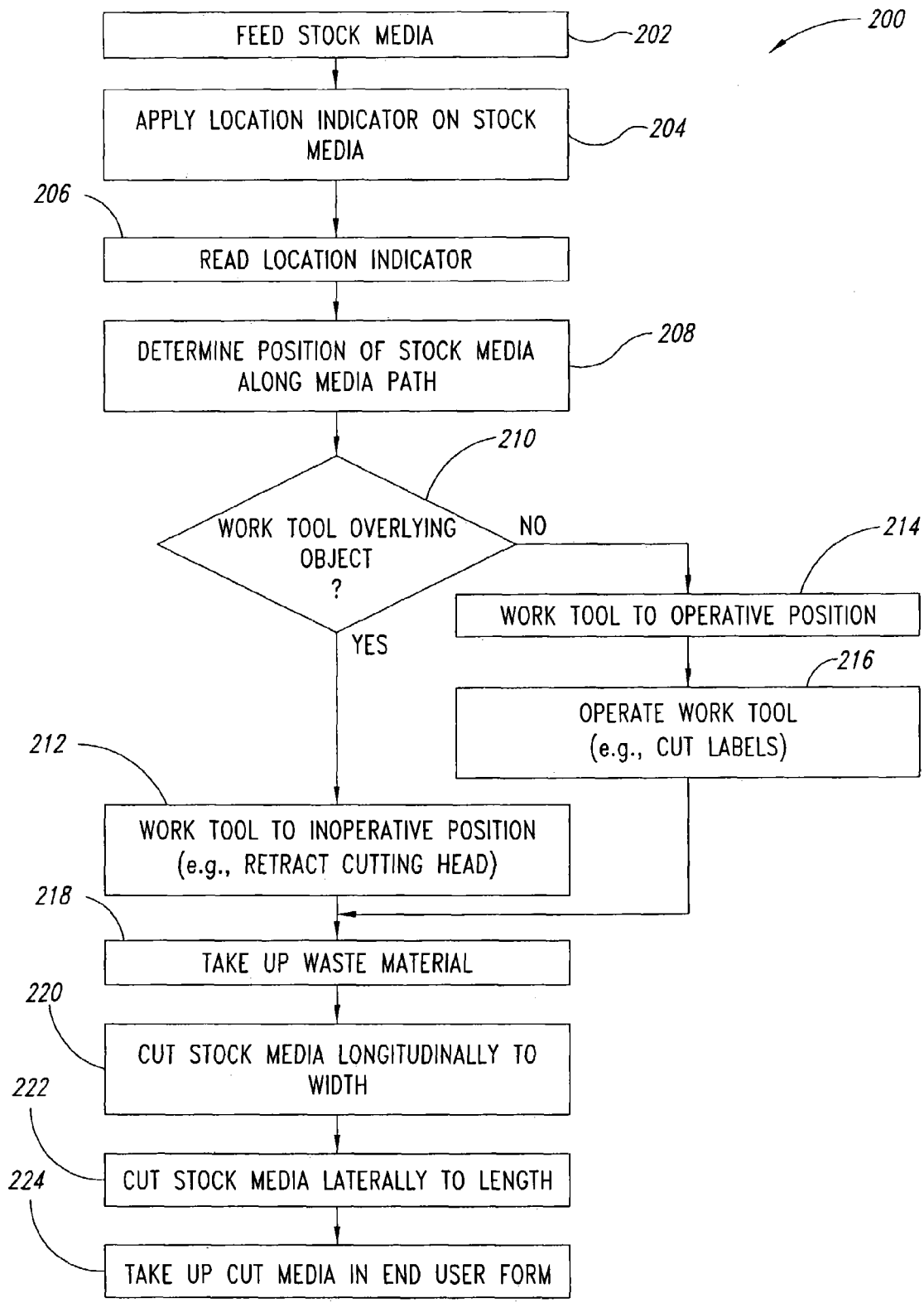
FIG. 9 is a flow diagram of a method of preparing media according to one illustrated embodiment employing the apparatus of FIG. 8.

FIG. 9 shows a method 200 of operating the apparatus 50 of FIG. 8 according to one illustrated embodiment.

In step 202, the stock media supply 52 supplies stock media 54 to the apparatus 50 along the media path 56 in a direction indicated by arrow 57. In step 204, the device 58 applies one or more location indicators 38 on stock media 54. In step 206, the reader 74 reads the location indicator 38. In step 208, a position detector 85 and/or computing system 66 determines a position of the stock media 54 as the stock media 54 moves along the media path 56.

In step 210 the computing system 66 determines when the object (e.g., RFID circuit 24) will be positioned under the work tool (e.g., cutting head 78). When the object underlies the work tool, the apparatus 50 ensures that the work tool is in an inoperative position (i.e., spaced distally from the media path 56) in step 212. For example, ensuring that the rotary cutter 80 and/or platen 84 is spaced normally from the media path 56. This may require action where the rotary cutter 80 and/or platen 84 are in the operative position (i.e., spaced proximate the media path 56), or may require no action where the rotary cutter 80 and/or platen 84 are already in the inoperative position. The computing system 66 activates actuator 90 accordingly. When the object is not underlying the work tool, the apparatus 50 ensures that the work tool is in the operative position in step 214, and operates the work tool in step 216, for example die cutting the stock media 54.

In step 218, the matrix take-up device 94 takes up the matrix (i.e., waste material), such as portions of the face layer 14 which have been cut away to form the individual tags or labels 30. In step 220, the apparatus 50 cuts the stock media 54 longitudinally to the desired width forming two or more continuous strips. In step 222, the apparatus 50 cuts the stock media 54 laterally to length, to form individual rolls 11 of an appropriate length or diameter. In step 224, the turret winder 100 takes up the cut media 10 to form rolls 11 suitable for use by the end user or other customer.

Figure 10A:
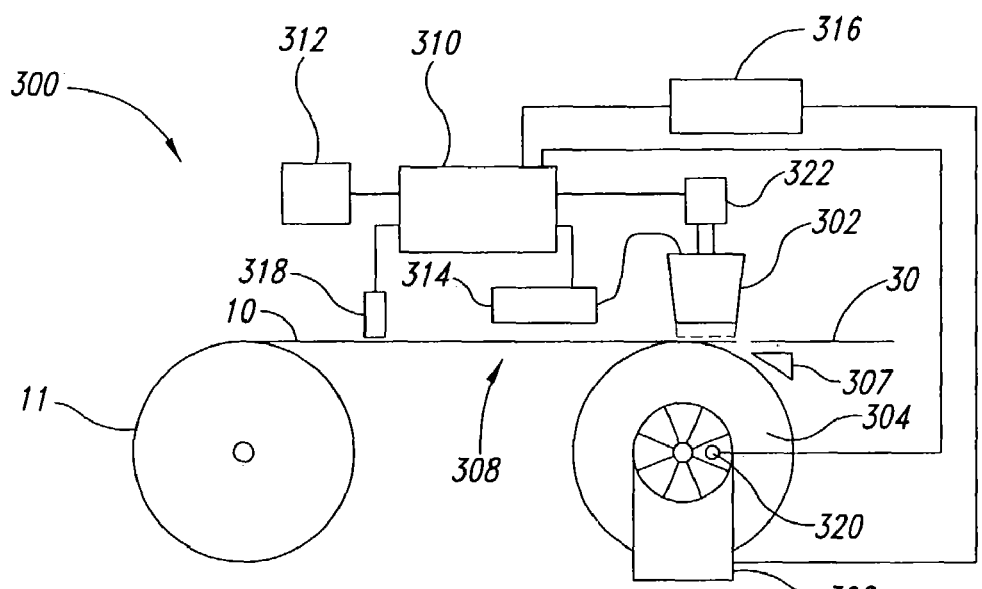
FIG. 10A is a schematic diagram of a first embodiment of a printer for printing information on the media, employing a movable printhead and a reader for reading a location indicator carried by the face sheet of the media.

FIG. 10A shows an apparatus for preparing media 10 in the form of a printer 300 for printing on the tags or labels 30 according to one illustrated embodiment. The printer 300 includes a printhead 302 and platen 304 for printing on the media 10. The printhead 302 may take a variety of forms including a thermal, laser, inkjet, or dot matrix printhead, although the disclosed embodiment is particularly suited to printers that exert force on the media 10, such as thermal printers. The printer 300 includes a motor 306 coupled to drive the platen 304 for moving the media 10 along a media path 308. An optional separator bar 307 separates the tags or labels 30 from the release liner 18.

The printer 300 also includes a processor 310 such as a microprocessor, and memory 312 such as random access memory (RAM), read only memory (ROM), and/or other processor readable memory. The processor 310 executes instructions from memory 312 to control the printing operation, including sending print signals to the printhead 302 via a print driver 314, and/or sending motor control signals to the motor 305 to drive the platen 304 via a motor controller 316.

Figure 10B:
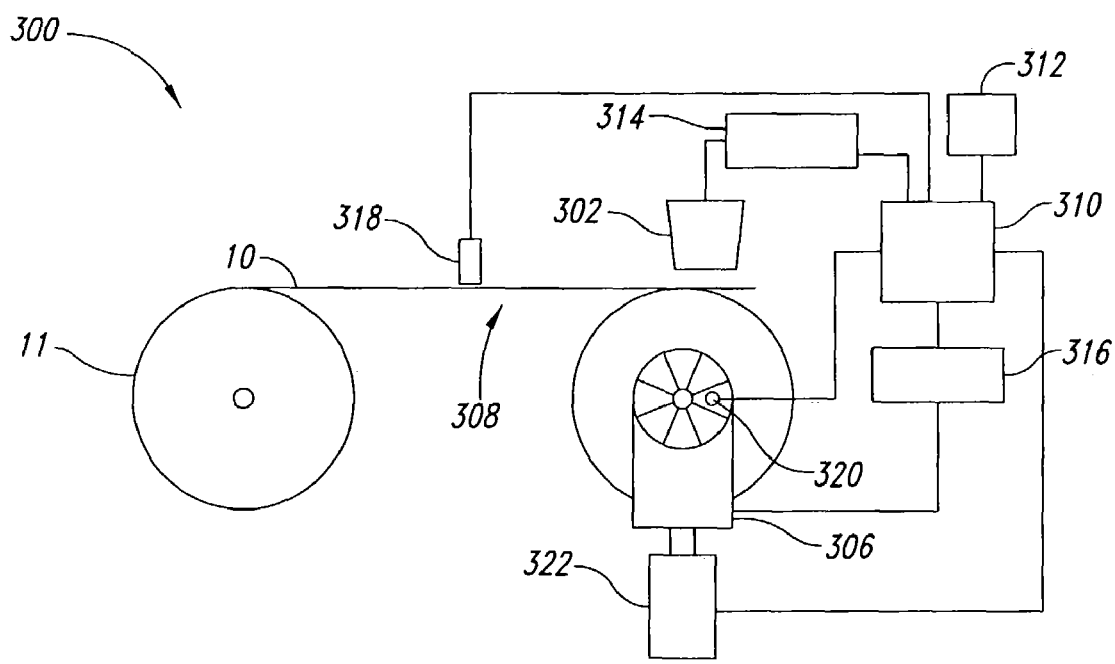
FIG. 10B is a schematic diagram of a second embodiment of a printer for printing information on the media, employing a movable platen and a reader for reading a location indicator carried by the face sheet of the media.

The printer 300 further includes a reader 318 positioned to read location indicators 38 from the media 10. For example, the reader 318 may be positioned as illustrated in FIGS. 10A and 10B to read location indicators 38 from the outer surface 20 (FIGS. 2A-2C) or inner surface 22 (FIGS. 3A-3B) of the face sheet 14 of the media 10. The reader 318 can take a variety of forms based on the particular form of location indicator 38. For example, the reader 318 may take the form of an optical reader such as an optical scanner or imager, a magnetic reader such as a magnetic strip reader, and/or an RF reader such as an RFID interrogator. The reader 318 provides the location information read from the location indicators 38 to the processor 310.

The printer 300 also includes a position sensor 320 to determine a position of the media 10 as the media 10 moves along the media path 308. The position sensor 320 may take any of a large variety of forms, for example an optical rotational encoder that senses the passing of optical marks carried by the shaft of the motor 305 or platen 304, or a magnetic Reed switch.

The printer 300 includes an actuator 322 under control of the processor 310 and physically coupled to move the printhead 302 normally with respect to a media path 308. FIG. 10A shows the printhead 302 (illustrated in broken line) in an operative position (i.e., proximate the media path), and the printhead 302 (illustrated in solid line) in an inoperative position (i.e., distal to the media path). As discussed above, the actuator 322 may take a variety of forms including a solenoid, hydraulic cylinder and piston and/or motor and mechanical linkage to name a few. The processor 310 employs the location information and position information to determine when the object (e.g. RFID circuit 24) will underlie the printhead 302. The processor 310 causes the actuator 322 to move the printhead 302 to the inoperative position when the object underlies the printhead 302, and causes the actuator 322 to move the printhead to the operative position when the object is not underlying the printhead 302.

Additionally, or alternatively, the processor 310 may employ the location and position information to actively drive the printhead 302 when the object (e.g., RFID circuit 24) is not underlying the printhead 302, and to stop driving the printhead 302 when the object is underlying the printhead 302. This approach may prevent damage to the object even where the printhead does not need to be selectively spaced from the media path 308. For example, this approach may prevent heat related damage caused by thermal printheads.

FIG. 10B shows an alternative embodiment of the printer 300, similar in many respects to that of FIG. 10A. In the embodiment of FIG. 10B, the actuator 322 is coupled to move the platen normally with respect to the media path 308. As demonstrated by the various embodiments, the printer 300 may include one or more actuators to move either, or both, the printhead 302 and platen 304.

Figure 10C:
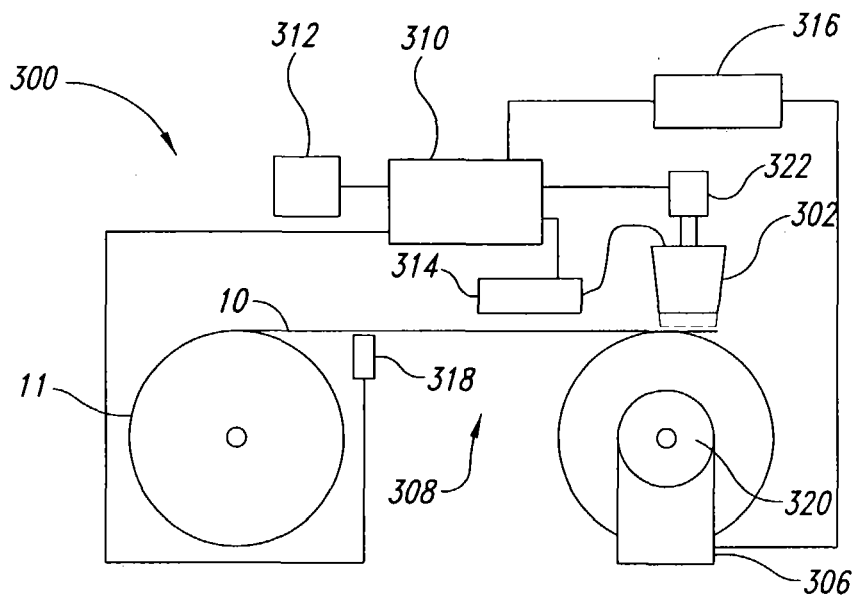
FIG. 10C is a schematic diagram of third embodiment of a printer for printing information on the media, employing a movable printhead and a reader for reading a location indicator carried by the release liner of the media.

FIG. 10C shows an alternative embodiment of the printer 300, similar in many respects to that of FIG. 10A. In the embodiment of FIG. 10C, the reader 318 is position to read location indicators 38 from the outer surface 40 (FIGS. 4A-4C) or inner surface 42 (FIGS. 5A-5B) of the release liner 18 of the media 10.

Figure 10D:
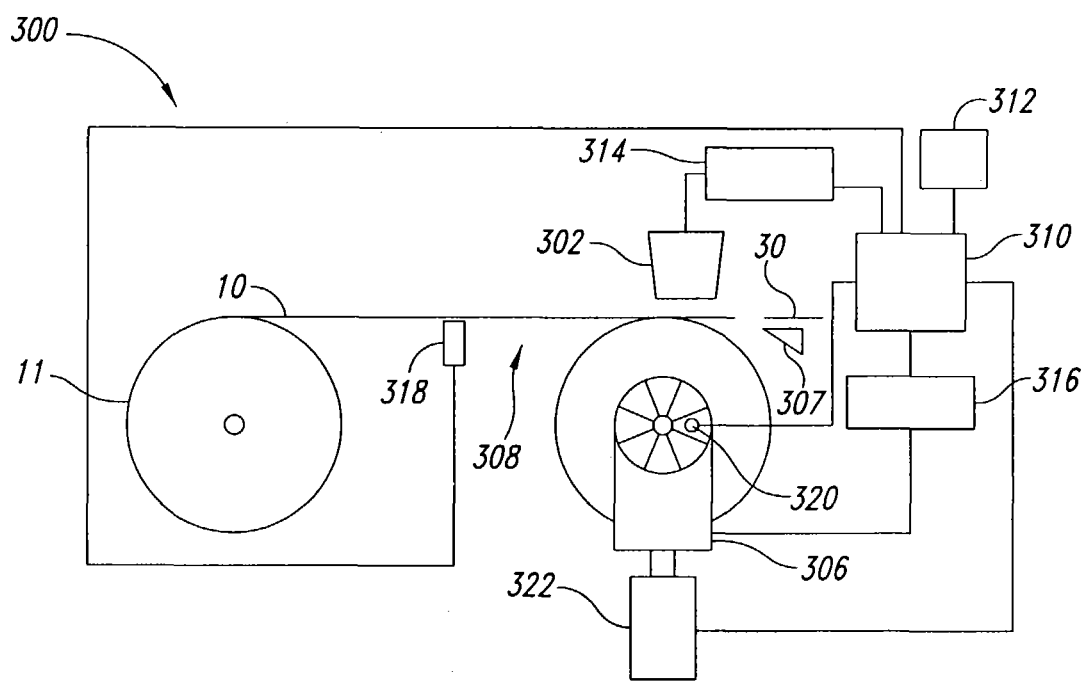
FIG. 10D is a schematic diagram of a fourth embodiment of a printer for printing information on the media, employing a movable platen and a reader for reading a location indicator carried by the release liner of the media.

FIG. 10D shows an alternative embodiment of the printer 300, similar in many respects to that of FIG. 10B. In the embodiment of FIG. 10D, the reader 318 is position to read location indicators 38 from the outer surface 40 (FIGS. 4A-4C) or inner surface 42 (FIGS. 5A-5B) of the release liner 18 of the media 10.

Figure 11:
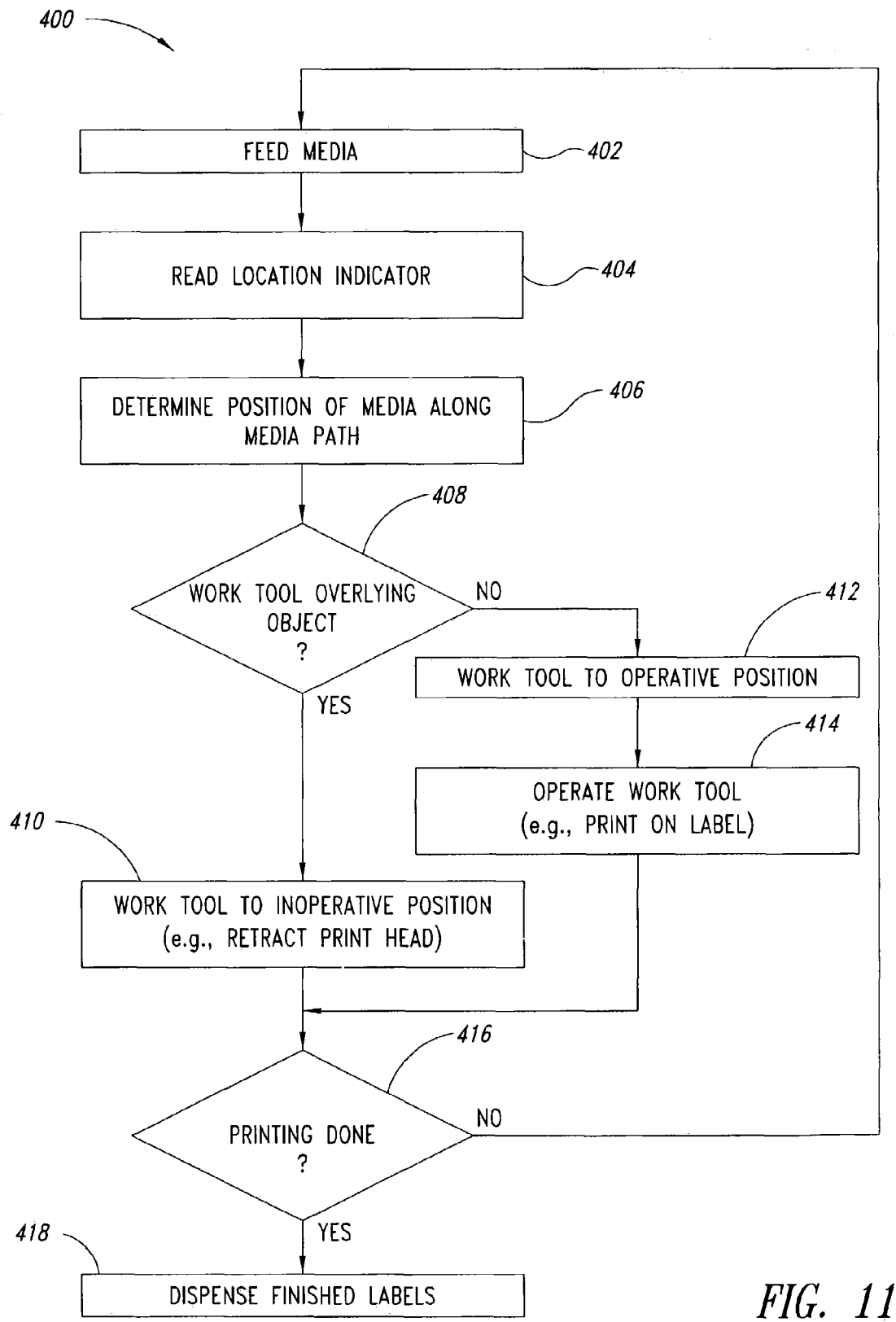
FIG. 11 is a flow diagram of an exemplary method of printing on media employing the apparatus of FIGS. 10A-10D.

FIG. 11 shows a method 400 of operating the printer 300 of FIGS. 10A-10D according to one illustrated embodiment. In step 402 the processor 310 supplies drive signals to the motor 306 via the motor controller 316 to drive the platen 304, causing the media 10 to move along the media path 308.

In step 304, the reader 318 reads the location information from the location indicator 38 carried by the media 10 or media carrier 12. In step 308, the processor 310 and/or position sensor 320 determine the position of the media 10 along the media path 308. In step 310, the processor 310 determines when the area 32 (e.g., object such as RFID circuit 24) will underlie the work tool (e.g. printhead 302 and/or platen 304).

In step, 410, the processor 310 provides signals to the actuator 322 that cause the actuator 322 to position the work tool 302, 304 in the inoperative position (i.e., spaced distally from the media path 308) when the area 32 will underlie the work tool 302, 304. In step 412, the processor 310 provides signals to the actuator 322 that cause the actuator 322 to position the work tool 302, 304 in the operative position (i.e., spaced proximate the media path 308) when the area 32 will not underlie the work tool 302, 304. In step 414, the processor 310 provides signals to the printhead 302 via the print driver 314 to cause the print head 302 to print on the media 10 when the work tool is in the operative position.

In step 416, the processor 310 determines whether the printing is finished. If the processor 310 determines that the printing is not finished, the processor 310 returns control to step 402. If the processor 310 determines that the printing is finished, the processor 310 causes the printer 300 to dispense the printed tag or label 30 in step 418, for example by advancing the media 10.

Although specific embodiments of and examples are described herein for illustrative purposes, various equivalent modifications can be made without departing from the spirit and scope of the invention, as will be recognized by those skilled in the relevant art.

For example, the teachings provided herein of can be applied to other forms of media, not necessarily the exemplary RFID tag and label barcode preparation (i.e., converting and/or printing) apparatus generally described above. Also for example, the apparatus and methods may employ any machine-readable indicators, not just the printed visual, magnetic, and RFID machine-readable indicators discussed above, for example, commercially available touch memory devices and or optical memory devices.

As another example, the apparatus may employ a variety of other commonly known structures for determining the position of the media along the media path. In some embodiments, one or more actuators may be coupled to move one or more rollers based on the location and position information, in order to move the media path while the position of the work tool remains fix, or while the position of the work tool is also adjusted.

As a further example, one or more of the RFID circuits 24 may store location information indicating the RFID circuits' own location on the media 10. As used herein the term RFID is used broadly to include any type of electromagnetic resonant circuit, with or with discrete memory, with or Without discrete controller, and with or without discrete power source, and without regard to the specific portion of the electromagnetic spectrum employed for communications. The location information may provide a margin beyond the actual physical location of the object, for example, to account for the varying label thickness immediately surrounding the object and/or to account for slight errors in alignment or registration. Additionally, or alternatively, the apparatus may apply an appropriate margin to the location information read from the location indicator.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to commonly assigned U.S. patent application Ser. No. 09/942,206, filed Aug. 28, 2001, and entitled "RF TAG APPLICATION SYSTEM"; U.S. Pat. No. 6,280,544, issued Aug. 28, 2001, and entitled "RF TAG APPLICATION SYSTEM"; U.S. Pat. No. 6,147,604, issued Nov. 14, 2000, and entitled "WIRELESS MEMORY DEVICE AND METHOD OF MANUFACTURE"; U.S. Pat. No. 6,114,962, issued Sep. 5, 2000, and entitled "RF TAG HAVING STRAIN RELIEVED STIFF SUBSTRATE AND HYDROSTATIC PROTECTION FOR A CHIP MOUNTED THERETO"; U.S. Pat. No. 6,278,413, issued Aug. 21, 2001, and entitled "ANTENNA STRUCTURE FOR WIRELESS COMMUNICATIONS DEVICE, SUCH AS RFID TAG"; and U.S. Pat. No. 6,286,763, issued Sep. 11, 2001, and entitled "METHOD AND APPARATUS TO AUTOMATICALLY SEARCH DATA CARRIERS, SUCH AS RFID TAGS AND MACHINE-READABLE SYMBOLS"; are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all media, media preparation apparatus and/or printers that operated in accordance with the claims. Accordingly, the invention is not limited by the disclosure, but instead its scope is to be determined entirely by the following claims.

The invention claimed is:

1. An apparatus to prepare media, comprising:
   a media path;
   a reader to read location information from a location indicator, the location information indicating a location along the media of a circuit carried by the media;
   a first media tool positioned along the media path and selectively actuatable to perform an action on at least a portion of the media moving along the media path,
   a media position detector positioned to detect a position of the media with respect to the first media tool as the media moves along the media path;
   at least a first actuator mechanically coupled to selectively retract the first media tool with respect to the media path; and
   a controller coupled to receive position information from the media position detector and location information from the reader, the controller configured to compare the position information and the location information and to provide signals to the first actuator to increase a distance between the first media tool and the media path when the location of the circuit carried by the media is proximate the first media tool and to decrease the distance between the first media tool and the media path when the location of circuit carried by the media is distal the first media tool.

2. The apparatus of claim 1 wherein the reader comprises at least one of an optical scanner, an imager, a radio frequency identification interrogator and a magnetic sensor and wherein the media position detector comprises at least one of an optical sensor, a rotational encoder, and a magnetic sensor.

3. The apparatus of claim 1 wherein the first media tool comprises at least one of a printhead, a platen and a cutting head.

4. The apparatus of claim 1 wherein the media path is fixed and the first media tool is moved.

5. The apparatus of claim 1 wherein the media path is moved and the first media tool is fixed.

6. The apparatus of claim 1 wherein the location indicator is carried by the media.

7. The apparatus of claim 1 wherein the location indicator is carried by a media carrier on which the media is carried.

8. The apparatus of claim 1 wherein the location indicator is printed on the media.

9. The apparatus of claim 1 wherein the location indicator is encoded in a radio frequency identification circuit carried by at least one of the media and a media carrier on which the media is carried.

10. The apparatus of claim 1, further comprising:
    a printhead proximate the media path and positioned before the first media tool with respect to a direction of movement of the media along the media path to print the location indicator on the media.

11. A media preparation apparatus, comprising:
    a media path;
    a reader to read location information identifying at least one location of an object carried by a media;
    a media position detector positioned along the media path to detect a position of the media as the media moves along the media path;
    a first media tool positioned along the media path and selectively actuatable to perform an action on at least a portion of the media moving along the media path, a distance between the first media tool and the media path being selectively adjustable between at least a first distance where the first media tool is proximate the media path and a second distance where the first media tool is distal from the media path with respect to the first distance; and
    a controller coupled to receive position information from the media position detector and location information from the reader, the controller configured to control the distance of the first media tool with respect to the media path based at least in part on the position information and the location information.

12. The media preparation apparatus of claim 11 wherein the controller is configured to increase the distance between the first media tool and the media path when the position information indicates a position approximately matching a location identified by the location information.

13. The media preparation apparatus of claim 11 wherein the controller is configured to increase the distance between the first media tool and the media path when the position information indicates a position approximately matching a location identified by the location information and to decrease the distance between the first media tool and the media path when the position information does not indicate a position approximately matching a location identified by the location information.

14. The media preparation apparatus of claim 11 wherein the reader comprises at least one of an optical scanner, an imager, a radio frequency identification interrogator and a magnetic sensor.

15. The media preparation apparatus of claim 11 wherein the media position detector comprises at least one of an optical sensor, a rotational encoder, and a magnetic sensor.

16. The media preparation apparatus of claim 11 wherein the first media tool comprises printhead and the action is printing.

17. The media preparation apparatus of claim 11 wherein the first media tool comprises a cutting head and the action is at least one of cutting, perforating and scoring.

18. The media preparation apparatus of claim 11 wherein the media path is fixed and the first media tool is moved.

19. The media preparation apparatus of claim 11 wherein the media path is moved and the first media tool is fixed.

20. The media preparation apparatus of claim 11, further comprising:
a platen that forms a portion of the media path, where the platen is moved and the media tool is fixed.

21. The media preparation apparatus of claim 11, further comprising:
a second media tool positioned along the media path and selectively actuatable to perform an action on at least a portion of the media moving along the media path, a distance between at least a third distance where the second media tool is proximate the media path and a fourth distance where the second media tool is distal from the media path with respect to the first distance.

22. The media preparation apparatus of claim 11 wherein the controller comprises a programmed microprocessor.

23. The media preparation apparatus of claim 11, further comprising:
a number of rollers forming at least a portion of the media path.

24. The media preparation apparatus of claim 11 wherein the object carried by the media is a radio frequency identification circuit and the location information corresponds to a location of the radio frequency identification circuit along the media.

25. The media preparation apparatus of claim 11 wherein the object carried by the media is a radio frequency identification circuit and the location information identifies a location of the radio frequency identification circuit along the media and is stored by the radio frequency identification circuit.

26. The media preparation apparatus of claim 11, further comprising:
a printhead proximate the media path and position before the first media tool with respect to a direction of movement of the media along the media path to print the location indicator on the media.

27. A media, comprising:
a substrate;
a number of radio frequency identification circuits carried by the substrate; and
at least one location indicator encoded in a radio frequency identification circuit carried by at least one of the media and a media carrier, the at least one location indicator indicating a position of at least one of the radio frequency identification circuits on the media.

28. A method of preparing a media, comprising:
reading location information from a location indicator carried by the media, the location indicator identifying at least one location of a circuit along the media;
determining a position of the media along a media path with respect to at least a first media tool as the media moves along the media path;
comparing the position of the media along the media path and the location information;
increasing a distance between the first media tool and the media path when the location of the circuit carried by the media proximate the first media tool; and
decreasing the distance between the first media tool and the media path when the location of circuit carried by the media is distal the first media tool.

29. The method of claim 28 wherein reading location information from a location indicator comprises one of: optically reading at least one optical marking from the media, magnetically reading at least one magnetic marking from the media, interrogating a radio frequency identification circuit carried by the media, and interrogating a radio frequency identification circuit carried by a media carrier that carries the media.

30. The method of claim 28 wherein determining a position of the media along a media path with respect to at least a first media tool comprises detecting at least one of optical markings on the media, detecting magnetic markings on the media, and detecting an angular position of a roller forming a portion of the media path.

31. The method of claim 28 wherein increasing a distance between the first media tool and the media path comprises moving at least one of a printhead, a platen and a cutting head in a direction normal to the media path.

32. The method of claim 28, further comprising:
printing at least one location indicator on the media before reading the location information from the location indicator.

33. A method of preparing a media, comprising:
reading location information identifying at least one location of an object carried by the media;
determining a position of the media along a media path;
determining when to adjust a distance between a first media tool and the media path based at least in part of the location information and the position of the media along the media path; and
adjusting the distance between the first media tool and the media path based on the determination.

34. The method of claim 33 wherein determining when to adjust a distance between a first media tool and the media path based at least in part of the location information and the position of the media along the media path includes determining to increase the distance between the first media tool and the media path when the position information indicates a position approximately matching a location identified by the location information and determining to decrease the distance between the first media tool and the media path when the position information does not indicate a position approximately matching a location identified by the location information.

35. The method of claim 33 wherein reading location information identifying at least one location of an object carried by the media comprises optically reading at least one optical marking from the media.

36. The method of claim 33 wherein reading location information identifying at least one location of an object carried by the media comprises magnetically reading at least one magnetic marking from the media.

37. The method of claim 33 wherein reading location information identifying at least one location of an object carried by the media comprises interrogating a radio frequency identification circuit carried by the media.

38. The method of claim 33 wherein reading location information identifying at least one location of an object carried by the media comprises interrogating a radio frequency identification circuit carried by a media carrier that carries the media.

39. The method of claim 33 wherein determining a position of the media along a media path comprises detecting at least one of optical markings on the media and magnetic markings on the media.

40. The method of claim 33 wherein determining a position of the media along a media path comprises detecting an angular position of a roller forming a portion of the media path.

41. The method of claim 33 wherein adjusting the distance between the first media tool and the media path comprises moving at least one of a printhead and a platen in a direction normal to the media path.

42. The method of claim 33 wherein adjusting the distance between the first media tool and the media path comprises moving at least one of a cutting head and a platen in a direction normal to the media path.

43. The method of claim 33 wherein adjusting the distance between the first media tool and the media path comprises moving the media path in a direction normal to the first media tool where the first media tool is fixed.

44. The method of claim 33, further comprising:
printing at least the one location indicator on the media before reading the location information from the location indicator.

45. An apparatus to prepare a media, comprising:
means for reading location information from a location indicator, the location indicator identifying at least one location along the media of a circuit carried by the media;
means for determining a position of the media along a media path with respect to at least a first media tool as the media moves along the media path;
means for comparing the position of the media along the media path and the location information; and
positioning means for increasing a distance between the first media tool and the media path when the location of the circuit carried by the media is proximate the first media tool and decreasing the distance between the first media tool and the media path when the location of circuit carried by the media is distal the first media tool.

46. The apparatus of claim 45 wherein the means for reading location information from a location indicator comprises at least one of an optical scanner, an imager, a radio frequency identification interrogator and a magnetic sensor.

47. The apparatus of claim 45 wherein the means for determining a position of the media along a media path comprises at least one of an optical sensor, a rotational encoder, and a magnetic sensor.

48. The apparatus of claim 45 wherein the means for comparing the position of the media along the media path and the location information comprises a microprocessor.

49. The apparatus of claim 45 wherein the positioning means comprises an actuator.

50. A media preparation apparatus, comprising:
a media path;
a reader to read location information identifying at least one location of an object carried by a media;
a media position detector positioned along the media path to detect a position of the media as the media moves along the media path;
a first media tool positioned along the media path and selectively actuatable to perform an action on at least a portion of the media moving along the media path; and
a controller coupled to receive position information from the media position detector and location information from the reader, the controller configured to selectively actuate the first media tool to perform the action on the portion of the media based at least in part on the position information and the location information.

51. The media preparation apparatus of claim 50 wherein the controller is configured to actuate the first media tool to perform the action on the portion of the media only when the position information does not indicate a position approximately matching a location identified by the location information.

52. The media preparation apparatus of claim 50 wherein the first media tool comprises printhead and the action is printing.

* * * * *